United States Patent Office 3,704,313
Patented Nov. 28, 1972

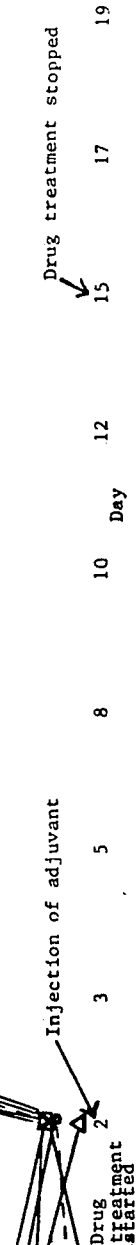

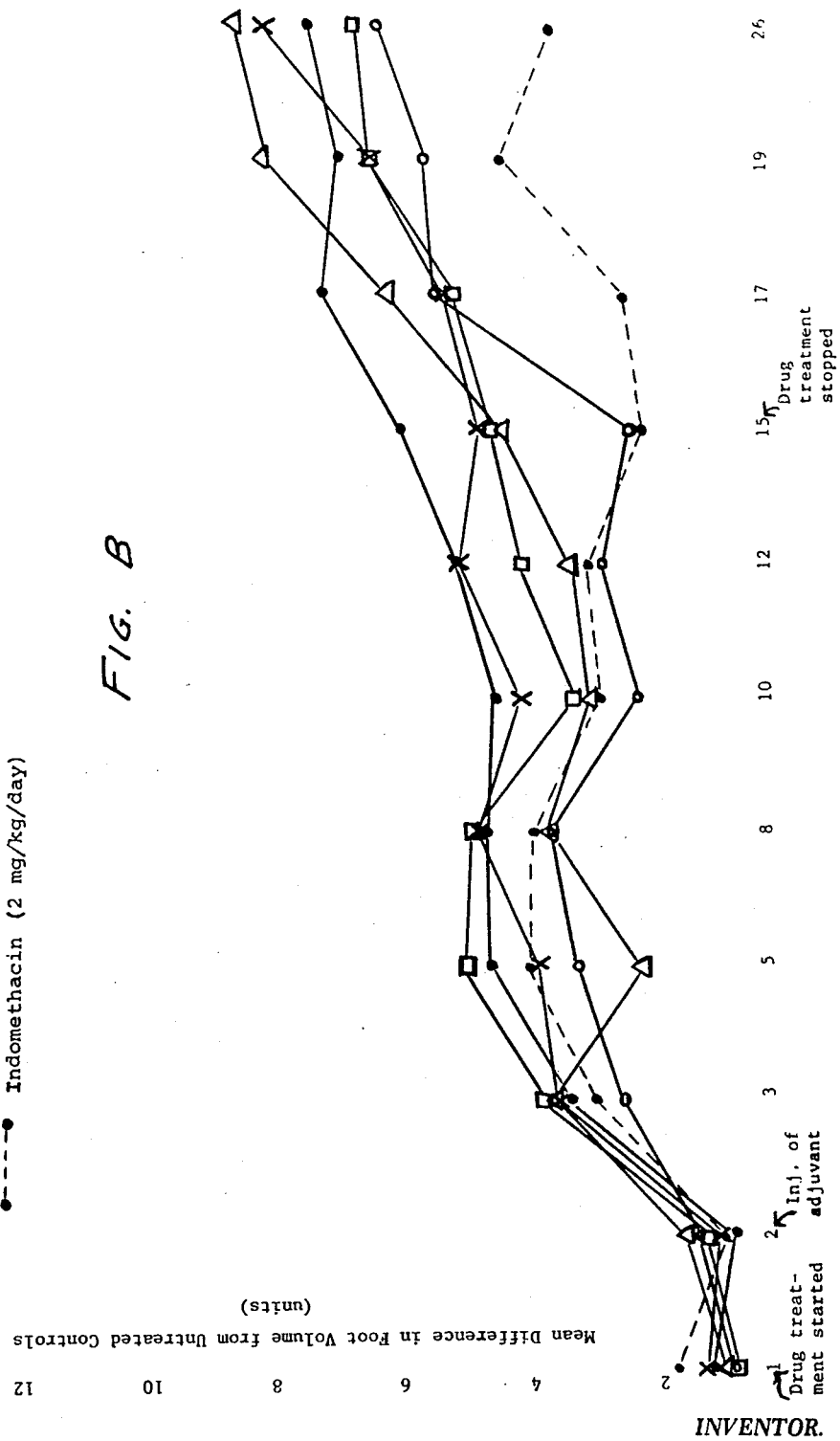

3,704,313
p-CYCLOHEXYLPHENYLGLYCOLIC ACID AND DERIVATIVES THEREOF
Julius Diamond, Lafayette Hill, Pa., assignor to William H. Rorer Inc., Washington, Pa.
Filed Oct. 10, 1968, Ser. No. 767,058
Int. Cl. C07c 65/14
U.S. Cl. 260—520                                    6 Claims

ABSTRACT OF THE DISCLOSURE

The compounds of this invention are non-steroids. When administered to mammals, they afford significant inhibition in the development of inflammation from polyarthritis and manifest significant analgesic and antipyretic activities in the treated mammal.

This invention relates to p-cycloalkylphenylglycolic acids and more particularly to m-halo-p-cycloalkylphenylglycolic acids, their non-toxic salts and lower alkyl esters.

The p-cycloalkylphenylglycolic acids, their non-toxic salts and esters have the formula (1) 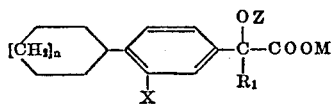

in which Z is hydrogen; lower alkanoyl of less than 5 carbon atoms or; aroyl of less than 8 carbon atoms; $R_1$ is hydrogen or lower alkyl of less than 5 carbon atoms; M is hydrogen, sodium, or a lower alkyl of less than 5 carbon atoms; X is a halogen or trifluoromethyl; and $n$ is 0, 1 or 2.

Examples of the lower alkyl are methyl, ethyl, isopropyl and n-butyl. Any one of the halogens—chlorine, bromine, iodine or fluorine—may be used. Examples of aroyl are benzoyl, p-chlorobenzoyl, toluoyl. Examples of lower alkanoyl are acetyl, propionyl, n-butyryl and isobutyryl.

The p-cycloalkylphenylglycolic acids may be produced by reacting with hydrogen in the presence of platinum oxide an m-halo-p-cycloalkylphenylglyoxylate having the formula:

(2) 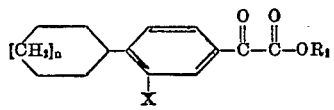

in which $R_2$ is a lower alkyl radical having less than 5 carbon atoms and X is a halogen. If $R_1$ of the p-cycloalkylphenylglycolic acid of the Formula 1 is an alkyl group, the m-halo-p-cycloalkylphenylglyoxylate of Formula 2 above is reacted with a Grignard Reagent having the formula:

(3)        $R_1MgX$ in which $R_1$ is lower alkyl having less than 5 carbon atoms and X is halogen. The reaction product of m-halo-p-cycloalkylphenylglyoxylate of Formula 2 above with hydrogen or with the Grignard Reagent is then hydrolyzed to produce the desired p-cycloalkylphenylglycolic acid. The p-cycloalkylphenylglycolic acid is then reacted in the presence of a tertiary amine, such as pyridine, picoline, or quinoline, with an alkanoyl chloride or aroyl chloride having the formula:

RCOCl in which R is lower alkyl, having less than 5 carbon atoms, or aryl such as phenyl, p-chlorophenyl, or tolyl.

The reaction which takes place with the m-halo-p-cycloalkylphenylglyoxylate with either hydrogen or the Grignard Reagent and the subsequent hydrolysis and acylation is represented as follows:

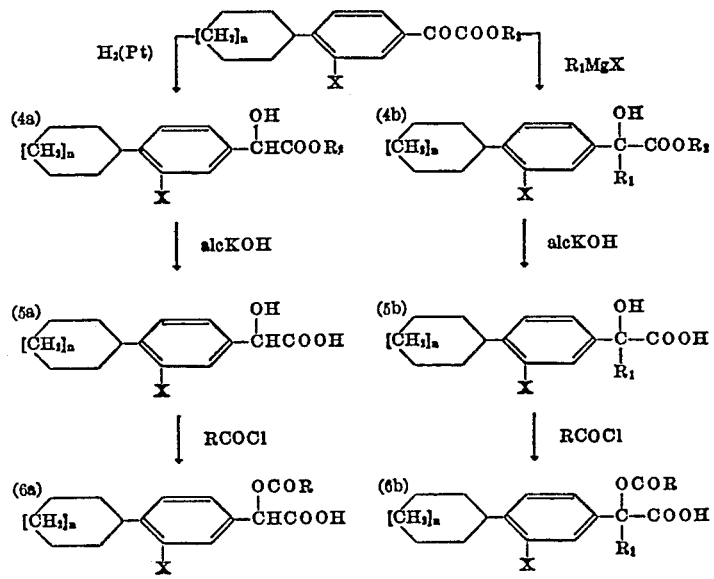

The m-halo-p-cycloalkylphenylglyoxylate (2) may be prepared by initially reacting, desirably at 16–18° C., cycloalkylbenzene with a lower alkyl oxalyl chloride in the presence of anhydrous aluminum chloride to produce an unhalogenated derivative. The reaction which takes place is represented by the following:

(7) 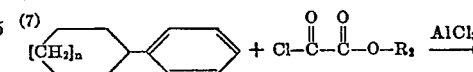

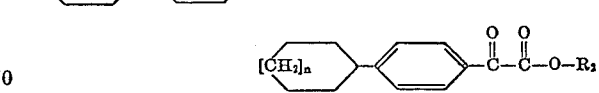

in which $R_2$ is a lower alkyl.

The unhalogenated derivative is then halogenated to the derivative of Formula 2 by subjecting it to iodine dissolved in an inert solvent, such as carbon tetrachloride. To the resulting solution is added a solution of the halogen in an inert solvent, such as carbon tetrachloride. Desirably, the solution of the required halogen is added dropwise to the solution of the unhalogenated derivative and iodine. Preferably, the addition is conducted by maintaining the temperature of the reaction mixture near 0° C. The reaction which takes place is as follows when chlorine is the halogen to be substituted:

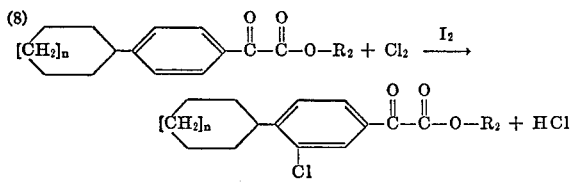

The sodium or potassium non-toxic salts of this invention are produced by reacting approximate stoichiometric amounts of the alkali hydroxides, alkali carbonates, or alkali bicarbonates, and the required quantity of m-halocycloalkylphenylglycolic acids.

The compositions of this invention manifest significant anti-inflammatory activity in polyarthritis when administered to a mammal in dosages of 1 to 100 milligrams per kilogram of body weight per day. The compositions of this invention also increase the pain-threshold and reduce fever when administered to mammals. Desirably, the compounds of this invention (1) are associated with solids or liquid pharmaceutically acceptable carriers for oral or parenteral administration in the treatment of arthritis or pain. The compounds may be in the form of capsules, tablets, powders, sterile solutions of water or other solvents or other dosage forms. The compounds may be admixed with diluents and adjuvants, such as lactose, gums, stearic acid or talc. One or a plurality of compounds of this invention may be administered to the mammal.

The compounds of this invention contain an asymmetric carbon atom and, as initially prepared, are the racemates composed of equal parts of the dextrorotary and levorotary stereoisomers of each such compound. The racemates of two of the compounds—m-chloro-p-cyclohexylphenylglycolic acid (Compound I) and m-chloro-p-cyclohexyl-α-methylphenylglycolic acid (Compound IV)—were prepared and each was separated into its respective dextrorotary and levorotary stereoisomers by reacting the racemate with an optically active base, for example, cinchonidine, separating the diastereomeric salts by fractional crystallzation, and hydrolyzing the salts with dilute hydrochloric acid. As later shown, the dextrorotary stereoisomer of each compound showed significantly greater activity from the corresponding levorotary stereoisomer and racemate when tested pharmacologically. The dextrorotary stereoisomers of Compounds I and IV, in their overall profile, showed an activity greater than aspirin and phenylbutazone and approached the activity of indomethacin. While the dextrorotary stereoisomer of Compound IV was more active than the dextrorotary stereoisomer of Compound I in Polyarthritis, Ultra Violet Erythema and Filter Paper Granuloma assays, it also showed less adverse effects than the corresponding dextrorotary stereoisomer of Compound I.

A more comprehensive understanding of this invention is obtained by reference to the following examples:

EXAMPLE I

Preparation of dl-m-chloro-p-cyclohexylphenylglycolic acid

Stage A. Preparation of p-cyclohexylphenylglyoxylic acid ethyl ester.—Cyclohexylbenzene 53 g. (0.33 mole) and 50.5 g. (0.37 mole) of ethyl oxalyl chloride were dissolved in 200 ml. of dry 1,1,2,2-tetrachloroethane (dried over anhyhdrous $MgSO_4$ overnight). Anhydrous $AlCl_3$ 52 g. (0.39 mole) was added in small portions to the reaction mixture with stirring over 2 hours. During the addition, the temperature of the mixture was maintained between 16–18° C. The mixture was stirred for an additional hour and allowed to stand overnight. The dark red solution was then slowly poured into 1500 ml. of iced saline solution with stirring. After standing, two layers formed. The aqueous layer was extracted with 500 ml. of ether and the ether extract was combined with the organic layer which was dissolved in 1500 ml. of ether and separated. The ether solution was washed with 10× 100 ml. portions of a 1:1 mixture of saturated NaCl solution and 10% HCl solution, and 5× 100 ml. portions of water. The ether solution was then dried over anhydrous $MgSO_4$ for 1 hour and filtered. The solvents were removed by distillation under reduced pressure. Distillation of the residue at 165–167° C. (1.1 mm.) gave 67.6 g. (80.7%) of yellow liquid product $N_D^{25}$ 1.5398.

Stage B. Preparation of m-chloro-p-cyclohexylphenylglyoxylic acid ethyl ester.—p-Cyclohexylphenylglyoxylic acid ethyl ester 98.9 g. (0.38 mole) and 6.1 g. of iodine (0.048 mole) were dissolved in 99 ml. of carbon tetrachloride. To this solution a solution of 40.4 g. (0.59 mole) of $Cl_2$ in 365 ml. of carbon tetrachloride was added dropwise over a period of 2 hours. During the addition, the temperature of the reaction mixture was maintained at 0° C. The red-brown mixture was stirred for 3 hours and allowed to stand overnight gradually warming to room temperature. The solvent and HCl were removed by distillation under reduced pressure. The residue was distilled at 190° C. (2.7 mm.) and 186.5° C. (1.9 mm.).

Analysis.—Calcd. for $C_{10}H_{19}ClO_3$: Cl, 12.03%; found: Cl, 13.47%. Yield: 94.8 g. (84.6%).

Stage C. Preparation of dl-m-chloro-p-cyclohexylphenylglycolic acid.—Into a Paar hydrogenation bottle was added 42.4 g. (0.144 mole) of m-chloro-p-cyclohexylphenylglyoxylic acid ethyl ester, 2 ml. of 0.1 M-$FeSO_4$ solution; 220 ml. of isopropanol, and 1.0 g. of 84.1% $PtO_2$. The mixture was shaken for 2 hours at room temperature with hydrogen gas (initial pressure 57 p.s.i.). The hydrogen uptake was 112% of theory at the end of 2 hours. The catalyst was filtered off. After adding 38 g. (0.7 mole) of KOH to the filtrate, it was heated at reflux temperature in a nitrogen atmosphere. The solution was concentrated in vacuo to a viscous oil, which was dissolved in 500 ml. of water, treated with Norit, and filtered through Celite 545. The filtrate was acidified with 10% HCl, and the precipitate was taken up in ether. The ether layer was dried over $MgSO_4$, treated with Norit, filtered through Celite 545, and the filtrate concentrated to a 100 ml. volume. Cyclohexane 150 ml. was added, and the solution was again concentrated to a 100 ml. volume, cooled to room temperature, and the white precipitate was collected and washed with 3× 20 ml. cyclohexane. The solid was dried at 110° C. for 2 hours. Yield: 27.5 g. (71.0%) M.P. 140–2° C. dec. Recrystallization from benzene 155: cyclohexane 155 gave a white product. Yield: 26.2 g. (67.7%) M.P. 142–3° C. dec.

Analysis.—Calcd. for $C_{14}H_{17}ClO_3$ (percent): C=62.57, H=6.38, Cl=12.19. Found (percent): C=62.94, H=6.40, Cl=12.58.

EXAMPLE II

Preparation of l-m-chloro-p-cyclohexylphenylglycolic acid

To a boiling solution of 29.4 g. (0.10 mole) of cinchonidine in 1 liter of absolute ethanol was added a boiling solution of 26.9 g. (0.10 mole) of dl-m-chloro-p-cyclohexylphenylglycolic acid in 500 ml. of absolute ethanol. The solution was stirred briefly then allowed to cool to room temperature overnight. The white crystalline precipitate was collected and washed with 2× 25 ml.

of ethanol and air dried. Yield 36.9 g. (65.5%). M.P. 234–5° C. Recrystallization from 3 liters of isopropanol gave white needle crystals; yield 16.1 g. (28.6%). M.P. 242–4° C. dec. This material was hydrolyzed with 200 ml. of 1.2 N-HCl. The white solid was collected, washed with 3× 50 ml. water and dried at 55° C. overnight; yield 7.5 g. (27.9%). Recrystallization from $C_6H_6/C_6H_{12}$ (75:50) gave 6.5 g. (24.2%) white solid, M.P. 147–50° C. dec. $[\alpha]_D$ −75° (c.=$C_2H_5OH$). A second recrystallization from $C_6H_6/C_6H_{12}$ (125:100) gave 5.5 g. (20.4%), M.P. 158–60° C. dec.

*Analysis.*—Calcd. for $C_{14}H_{17}ClO_3$ (percent): C=62.57, H = 6.38, Cl = 13.19. Found (percent): C = 62.67, H=6.33, Cl=12.87.

EXAMPLE III

Preparation of *d*-m-chloro-p-cyclohexylphenylglycolic acid

The combined ethanol and isopropanol filtrates from Example II were evaporated to dryness. Yield, 35 g. (62.2%). M.P. 235–7° C. dec. This material was triturated with 1 liter of boiling acetone. The material which did not go into solution was filtered off; yield 25 g. (44.4%). M.P. 230–40° C. dec. The filtrate was evaporated to dryness; yield 10.0 g. (17.8%). M.P. 211–15° C. dec. This material was hydrolyzed with 100 ml. of 1.2 N-HCl. The white crystalline precipitate was collected, washed with 3× 25 ml. of water, and dried at 55° C., yield 4.8 g. (17.8%). M.P. 155–9° C. dec. Recrystallization from $C_6H_6/C_6H_{12}$ (75:50) gave 4.3 g. (16%). M.P. 158–60° C. dec., $[\alpha]_D$ +82.5° (c.=1, $C_2H_5OH$).

*Analysis.*—Calcd. for $C_{14}H_{17}ClO_3$ (percent): C=62.57, H = 6.38, Cl = 13.19. Found (percent): C = 62.75, H=6.42, Cl=13.30.

EXAMPLE IV

Preparation of *dl*-m-chloro-p-cyclohexyl-α-methyl-phenylglycolic acid

Methylmagnesium iodide solution was prepared from 6.7 g. (0.047 mole) of methyl iodide, 1.24 g. (0.051 g.-atom) of magnesium turnings, and 40 ml. of anhydrous ether. This solution was added over a period of 1 hour to a solution of 15 g. (0.0508 mole) of m-chloro-p-cyclohexylphenylglyoxylic acid ethyl ester. The addition was carried out with vigorous stirring at 0 to 5° C. The red-brown solution was then allowed to stand at room temperature overnight. The mixture was poured into an ice-cold solution of 0.2 $M\text{-}H_2SO_4$. The ether layer was separated, extracted with 3× 70 ml. of 1% $H_2SO_4$, dried over $MgSO_4$, filtered, and evaporated. Yield 16.9 g. red-brown oil. The oil was refluxed for 3 hours under $N_2$ with a solution of 100 ml. of 10% $Na_2CO_3$ and 20 ml. of ethanol. After cooling to room temperature, the solution was treated with Norit, filtered, and evaporated. The solid residue was crystallized from benzene 25:cyclohexane 230 to give a white crystalline precipitate which was collected on a filter, washed 3× 25 ml. cyclohexane, and dried at 98°/0.1 mm. for 3 hours. Yield 8.0 g. (55.6%), M.P. 149.5–150.5° C. dec.

*Analysis.*—Calcd. for $C_{15}H_{19}ClO_3$ (percent): C=63.71, H = 6.77, Cl = 12.54. Found (percent): C = 63.52, H=6.62, Cl=13.16.

EXAMPLE V

Preparation of *l*-m-chloro-p-cyclohexyl-α-methyl-phenylglycolic acid

To a boiling solution of 20.3 g. (0.069 mole) of cinchonidine in 2 liters of acetone was added 19.5 g. (0.069 mole) of *dl*-m-chloro-p-cyclohexyl-α-methyl-phenylglycolic acid dissolved in 250 ml. of acetone. The resulting mixture was refluxed for 5 minutes and filtered hot; yield 21 g. (52.8%), M.P. 232–3° C. dec. Trituration with 2× 500 ml. of acetone at room temperature gave 19.3 g. (48.5%), M.P. 232° C. dec. The cinchonidine salt was hydrolyzed with 200 ml. of 1.2 N-HCl, filtered, washed with 3× 50 ml. water, and dried at 80°; yield 9.0 g. (46.1%), M.P. 126–33° C. dec. $[\alpha]_D$ −16° (c.=1, $C_2H_5OH$). Recrystallization from n-heptane gave 6.2 g. 31.8%), M.P. 128° C. dec., $[\alpha]_D$ −31.5° C. (c.=1, $C_2H_5OH$).

*Analysis.*—Calcd. for $C_{15}H_{19}ClO_3$ (percent): C=63.71, H = 6.77, Cl = 12.54. Found (percent): C = 64.40, H=7.00, Cl=12.44.

EXAMPLE VI

Preparation of *d*-m-chloro-p-cyclohexyl-α-methylphenylglycolic acid

The acetone filtrate from Example V was cooled to room temperature to give a white precipitate which was collected; yield 2.2 g. (5.5%), M.P. 220–221° C. dec. The filtrate was taken to dryness, triturated with 100 ml. of ether, filtered and dried at 50° C.; yield 13.5 g. (33.9%), yellow crystals, M.P. 212–13° C. dec. The cinchonidine salt was hydrolyzed with 100 ml. of 1.2 N-HCl, filtered, washed wtih 3× 50 ml. water, and dried at 80° C.; yield 6.5 g. (33.3%), M.P. 126–8° C. dec., $[\alpha]_D$ +35° (c.=1, $C_2H_5OH$).

*Analysis.*—Calcd. for $C_{15}H_{19}ClO_3$ (percent): C=63.71, H = 6.77, Cl = 12.54. Found (percent): C = 63.77, H=6.67, Cl=12.71.

EXAMPLE VII

Preparation of *d*-m-chloro-p-cyclohexyl-α-methylphenylglycolic acid benzoate

The compound from Example VI, 5.66 g. (0.02 mole), is dissolved in 30 ml. of dry pyridine and 2.5 ml. (0.022 mole) of benzoyl chloride is added dropwise while stirring at 0° C. After 1 hour at 0° C., the reaction mixture is allowed to warm to room temperature, and poured into excess cold, dilute hydrochloric acid. The mixture is extracted with n-hexane, and the hexane extract is washed with water, then dried over anhydrous $MgSO_4$ and filtered. Evaporation of the solvent from the filtrate leaves the benzoate.

The benzoate was purified by trituration with acetic acid. Yield: 2 g.; M.P. 131–4° C. dec., $[\alpha]_D$ +10° C. (c.=1, $C_2H_5OH$).

EXAMPLE VIII

Corresponding p-cycloalkylphenylglycolic acid in which *n* is 0 or 2 of Compound 1

Such corresponding compounds are prepared in the same manner as the compounds of Examples I through VII, except that the starting material is a cyclopentyl or cycloheptyl compound.

Brief descriptions of the pharmacological tests conducted are given below:

CARRAGEENIN PAW EDEMA

Of the substances used to induce local irritation, carrageenin was selected since most known non-steroidal anti-inflammatory agents inhibit this inflammation.

Ten male rats per dose group (120–150 grams) were given one-half of the test material orally. Thirty minutes later, the remainder of the dose was given and 0.2 ml. of a 1% carrageenin solution was injected subdermally into the plantar surface of the hind paw. Each paw is marked as a consistent anatomical site, then immersed in a mercury bath to that point. The mercury bath is connected to a pressure transducer and the volume of displacement is read directly on a recorder. Three hours after drug administration, the hind paw volume is measured again. The increased volume is an index of edema. Treated groups are compared to a placebo-treated group to calculate the percent inhibition of edema.

FILTER PAPER GRANULOMA

This assay was used to evaluate anti-inflammatory agents and to determine the lowest dose which produces significant inhibition of granuloma growth. This assay has the advantage of being semi-acute (4–7 days). The usual end point involves obtaining the wet weight as well as the dry weight of the granuloma.

Small discs of filter paper saturated with carrageenin were placed subcutaneously in each rat on the first day of the study. Test compound was administered orally on a B.I.D. basis on Day 1 to Day 4. On Day 5, a single dose was given in the morning and the animals were sacrificed in the afternoon. Both filter paper discs were removed and trimmed of extraneous tissue and then weighed. After drying in an oven over the weekend, the dry weight was obtained. Activity was determined by the difference in granuloma weight between a placebo-treated control group and the drug-treated groups.

RANDALL-SELITTO ANALGESIA TEST

In accordance with the Randall-Selitto test for measuring the pain threshold, the pressure needed on a metal plunger to a give a "pain response" in a rat when the plunger is placed in the yeast-inflamed hind paw of a rat is measured. Following measurement of control "pain threshold," yeast was injected into the paw and the test compound was given orally. The "pain threshold" was measured at hourly intervals and compared to a placebo-treated control group.

ANTI-PYRETIC ASSAY

Brewer's yeast was injected subcutaneously in rats and rectal temperatures were obtained at the end of five hours. Those rats (10 per group) having a significant "fever" were given test compounds and rectal temperatures were measured at hourly intervals for 2–3 hours. (A positive response occurs when rectal temperature decreases by 1° C. or more.)

PHENYLQUINONE ANALGESIA

Mice were pre-treated orally with test compound and then given 1.25 mg./kg. phenylquinone i.p. to produce a series of "writhes" (severe intestinal contractions). The number of "writhes" was recorded. The percent decrease was calculated from the incidence of "writhes" in a placebo-treated control group.

ULTRA-VIOLET ERYTHEMA IN GUINEA PIGS

Erythema associated with inflammation was used in the assay. Restricted areas of a guinea pig were exposed to a controlled ultraviolet light and after two hours, the exposed areas were graded for the extent of erythema.

POLYARTHRITIS IN RATS

Twelve rats per dose group were treated (B.I.D.) starting the day before injection of adjuvant. Paw volumes were measured for both hind paws on several days during and following drug treatment. Drug was given for a period of 15 days. The paw volume was compared to an untreated control group to determine volume increase. Drug action was calculated as the percent decrease in paw volume (inflammation) as compared to an adjuvant-treated control. Gross signs of inflammation were scored on a weekly basis and drug action calculated as a decrease in total score. Body weights were recorded at intervals.

GASTRIC IRRITATION

Rats fasting for 48 hours were tested. The drug was given orally and the animals sacrificed at the end of five hours. The stomachs were examined for irritation and the animals were graded positive or negative and $ED_{50}$ values calculated.

The results of these tests, and a comparison with standard drugs, are given in Tables I, II and III, and FIGS. A and B, which are shown on the accompanying drawings.

FIG. A indicates the effect of compounds II, III and VI on the volume of the adjuvant-treated hind paw (right); and FIG. B indicates the effect of compounds II, III and VI on the volume of the contralateral hind paw (left).

LEGEND FOR TABLE III

PQW _____ Phenylquinone writhing.
RSA _____ Randall-Selitto analgesia.
CPE _____ Carrageenin paw edema.
UVE _____ Ultra violet erythema.
FPG _____ Filter paper granuloma.
AP _____ Anti-pyresis.
P.T. _____ Pain threshold.
P/T _____ Number positive/total.

TABLE I.—SUMMARY OF ANTI-INFLAMMATORY ASSAYS

| Test compound | Phenylquinone writhing | | Randall-Selitto analgesia | | Carrageenin paw edema | | Ultra violet erythema | | Filter paper granuloma | | Anti-pyresis | |
|---|---|---|---|---|---|---|---|---|---|---|---|---|
| | Dose, mg./kg., p.o. | Percent decrease | Dose, mg./kg. | Percent increase | Dose, mg./kg. | Percent decrease | Dose, mg./kg. | Number positive/total | Dose, mg./kg. | Percent decrease inflammation | Dose, mg./kg. | Number positive/total |
| dl-m-Chloro-p-cyclohexylphenyl-glycolic acid | 10 | 45 | 50 | 95 | 50 | 38 | 10 | 3/8 | 50 | 12 | 10 | 2/8 |
| | 20 | 41 | 100 | 94 | 100 | 35 | 25 | 5/8 | 100 | 35 | 25 | 6/8 |
| | 25 | 46 | | | | | 35 | 7/8 | | | 50 | 7/7 |
| | 40 | 88 | | | | | 50 | 8/8 | | | 100 | 6/6 |
| | 80 | 97 | | | | | | | | | | |
| | 150 | 95 | | | | | | | | | | |
| | $ED_{50}=22$ | | | | | | $ED_{50}=14.5$ | | | | $ED_{50}=18$ | |
| d-m-Chloro-p-cyclohexylphenyl-glycolic acid | 6.25 | 46 | 50 | 68 | 35 | 38 | 12.5 | 7/8 | | | 12.5 | 2/8 |
| | 12.5 | 48 | 100 | 77 | 50 | 34 | 25 | 8/8 | | | 25 | 3/8 |
| | 25 | 83 | | | 100 | 24 | 35 | 8/8 | | | 50 | 6/8 |
| | 50 | 100 | | | | | | | | | 100 | 7/8 |
| | $ED_{50}=10$ | | | | | | $ED_{50}=4-8$ | | | | $ED_{50}=28$ | |
| l-m-Chloro-p-cyclohexylphenyl-glycolic acid | 37.5 | 0 | 18.75 | 47 | 50 | 9 | | | | | 18.75 | 0/8 |
| | 75 | 16 | 37.5 | 41 | 100 | 11 | | | | | 37.5 | 3/8 |
| | 150 | 12.2 | 75 | 40 | | | | | | | 75 | 4/8 |
| | 300 | 77 | 150 | 79 | | | | | | | 150 | 5/8 |
| | $ED_{50}=195$ | | | | | | $ED_{50}=16.0$ | | | | $ED_{50}=75$ | |
| dl-m-Chloro-p-cyclohexyl-α-methylphenyl-glycolic acid | 10 | 34 | 50 | 74 | 50 | 1.0 | 10 | 4/8 | 50 | 23 | 10 | 2/8 |
| | 20 | 50 | 100 | 82 | 100 | 15.0 | 25 | 7/8 | 100 | 24 | 20 | 3/8 |
| | 40 | 67 | | | | | 35 | 8/8 | | | 50 | 7/8 |
| | 80 | 100 | | | | | | | | | 80 | 8/8 |
| | | | | | | | | | | | 100 | 8/8 |
| | $ED_{50}=19.5$ | | | | | | $ED_{50}\cong10$ | | | | $ED_{50}=28$ | |

TABLE I—Continued

| Test compound | Phenylquinone writhing Dose, mg./kg., p.o. | Phenylquinone writhing Percent decrease | Randall-Selitto analgesic Dose, mg./kg. | Randall-Selitto analgesic Percent increase | Carrageenin paw edema Dose, mg./kg. | Carrageenin paw edema Percent decrease | Ultra violet erythema Dose, mg./kg. | Ultra violet erythema Number positive/total | Filter paper granuloma Dose, mg./kg. | Filter paper granuloma Percent decrease inflammation | Anti pyresis Dose, mg./kg. | Anti pyresis Number positive/total |
|---|---|---|---|---|---|---|---|---|---|---|---|---|
| $d$-m-Chloro-p-cyclohexyl-$\alpha$-methylphenyl-glycolic acid | 12.5 | 41 | 12.5 | 48 | 50 | [1] 25 | 2.5 | 4/8 | 50 | 29 | 12.5 | 1/8 |
| | 25 | 38 | 25 | 57 | 100 | [2] 42 | 5 | 8/8 | | | 25 | 3/8 |
| | 50 | 45 | 50 | 57 | | | 10 | 8/8 | | | 50 | 5/8 |
| | 100 | 56 | 100 | 60 | | | | | | | 100 | 7/8 |
| | $ED_{50}=35$ | | | | | | $ED_{50}=<3$ | | | | $ED_{50}=35$ | |
| $l$-m-Chloro-p-cyclohexyl-$\alpha$-methylphenyl-glycolic acid | 25 | 31 | 12.5 | 30 | 50 | 16 | 10 | 4/8 | 50 | 0 | 12.5 | 0/8 |
| | 50 | 20 | 25 | 23 | 100 | 22 | 25 | 7/8 | 100 | 29 | 25 | 1/8 |
| | 100 | 49 | 50 | 26 | | | 35 | 8/8 | | | 50 | 1/8 |
| | 150 | 60 | 100 | 36 | | | | | | | 100 | 3/8 |
| | $ED_{50}=100$ | | | | | | $ED_{50}\cong10$ | | | | $ED_{50}=>100$ | |

[1] 29 (i.p.).
[2] 51 (i.p.).

TABLE II

Gastric irritation

| Test compound: | $ED_{50}$ mg./kg. |
|---|---|
| $dl$-m-Chloro-p-cyclohexylphenylglycolic acid | 7 |
| $dl$-m-Chloro-p-cyclohexyl-$\alpha$-methylphenylglycolic acid | 59 |
| $d$-m-Chloro-p-cyclohexyl-$\alpha$-methylphenylglycolic acid | 21.5 |
| $l$-m-Chloro-p-cyclohexyl-$\alpha$-methylphenylglycolic acid | 80 |
| Aspirin | 36 |
| Indomethacin | *1-2 |

*Estimated.

TABLE III.—ANTI-INFLAMMATORY ACTIVITY OF STANDARD DRUGS

| Test compound | Dose, mg./kg. | Route | P.Q.W. Percent ↓ | P.Q.W. $ED_{50}$, mg./kg. | R.S.A., percent PT ↑ | C.P.E. percent ↓ | U.V.E. $ED_{50}$, mg./kg. | F.P.G., percent ↓ | A.P. #P/T | A.P. $ED_{50}$, mg./kg. |
|---|---|---|---|---|---|---|---|---|---|---|
| Aspirin | 10 | PO | | | | | | 38 | 3/8 | 15 |
| | 12.5 | PO | 41 | 30 | | | | | | |
| | 25 | PO | 55 | | | | | | 6/8 | |
| | 50 | PO | 53 | | | 10 | 21 | | 6/8 | |
| | 75 | PO | 87 | | | | | | | |
| | 100 | PO | | | | 16 | 19 | | 8/8 | |
| | 150 | PO | | | | | | | 8/8 | |
| | 200 | PO | | | | 40 | 49 | | | |
| | 400 | PO | | | | 48 | 62 | | | |
| | 800 | PO | | | | | 54 | | | |
| Indo-methacin | .1 | PO | 33 | 0.37 | | | | 0.97 | | |
| | .5 | PO | 39 | | | | | | | |
| | .625 | PO | | | | 0 | | | | |
| | 1.25 | PO | 76 | | | 5 | 16 | | | |
| | 2.5 | PO | 75 | | | 13.6 | 27 | | | |
| | 5.0 | PO | 93 | | | 32 | 47 | | | |
| | 10.0 | PO | | | | | 47.5 | | 2/8 | 14 |
| | 20.0 | PO | | | | | 49 | | 6/8 | |
| | 30.0 | PO | | | | | | | 7/8 | |
| | 40.0 | PO | | | | | | | 7/8 | |
| Phenyl-butazone | 25 | PO | 28 | 90 | | | 3.8 | | 1/8 | 100 |
| | 50 | PO | 16 | | | 27 | 44 | 0→20 | | |
| | 100 | PO | | | | 27 | 50 | | 6/8 | |
| | 150 | PO | 66 | | | | | | | |
| | 200 | PO | | | | 54 | 71 | | 6/8 | |
| | 300 | PO | 86 | | | | | | | |
| | 400 | PO | | | | 76 | 69 | | 8/8 | |

The compounds of this invention may be administered to a mammal in the form of a pharmaceutically acceptable salt, in the form of tablets, injectable ampoules, suppositories, saccharine, granules, syrup or other dosage unit forms.

What is claimed is:

1. A compound which is m-chloro-p-cyclohexylphenylglycolic acid or non-toxic salt or loweralkyl ester thereof of less than 5 carbon atoms.

2. A compound of claim 1 in which the compound is dextrorotary.

3. A compound of claim 1 in which the compound levorotary.

4. A compound of claim 2 which is $d$-m-chloro-p-cyclohexylphenylglycolic acid.

5. A compound of claim 3 which is $l$-m-chloro-p-cyclohexylphenylglycolic acid.

6. A compound of claim 1 which is $dl$-m-chloro-p-cyclohexylphenylglycolic acid.

References Cited

UNITED STATES PATENTS 3,435,075    3/1969    Glamkowski _____ 260—590

LORRAINE A. WEINBERGER, Primary Examiner

J. F. TERAPANE, Assistant Examiner

U.S. Cl. X.R.

260—284, 469, 473 A, 476 R, 488 CD; 424—308, 311, 317